Figure 1:
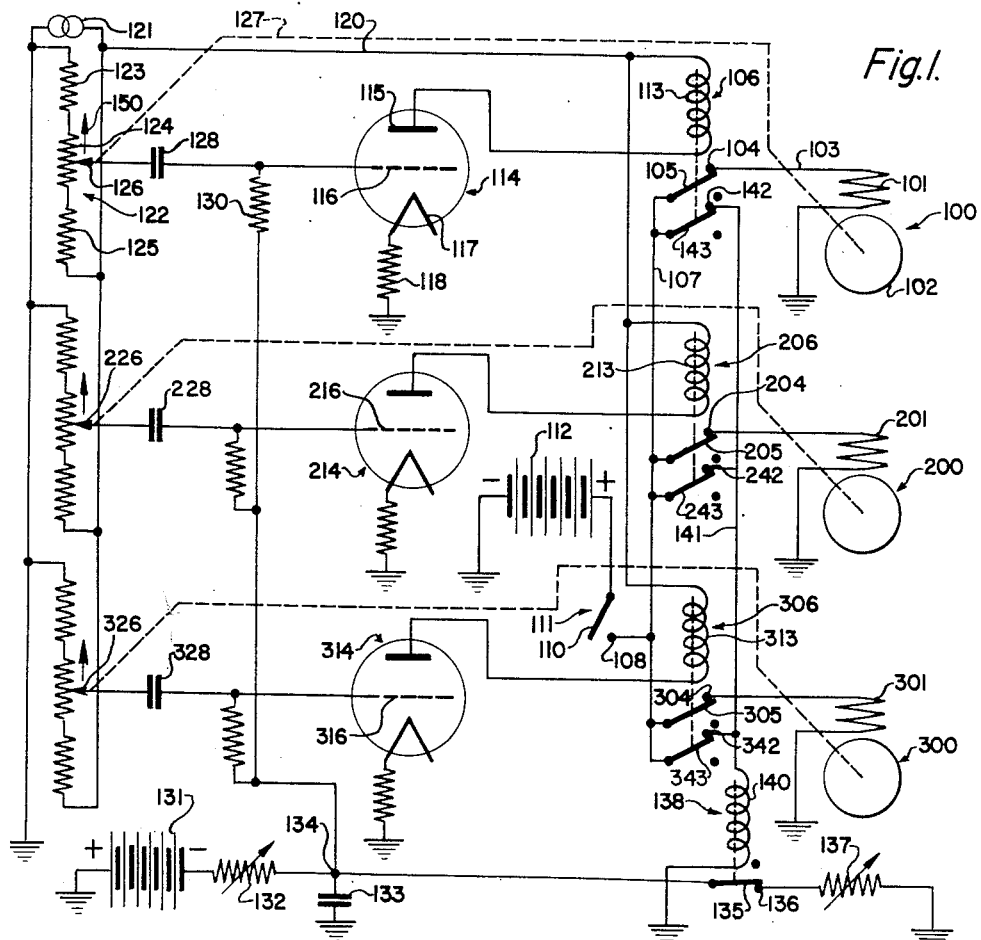

Nov. 9, 1954  N. M. BROWN, JR  2,694,170
MOTOR SYNCHRONIZING SYSTEM
Filed June 26, 1953  2 Sheets-Sheet 1

NORMAN M. BROWN, JR.
INVENTOR.

BY John H. J. Wallace

Nov. 9, 1954

N. M. BROWN, JR 2,694,170

MOTOR SYNCHRONIZING SYSTEM

Filed June 26, 1953

2 Sheets-Sheet 2

NORMAN M. BROWN, JR.
INVENTOR.

BY John H. J. Wallace

# United States Patent Office 2,694,170
Patented Nov. 9, 1954

2,694,170

MOTOR SYNCHRONIZING SYSTEM

Norman M. Brown, Jr., Los Angeles, Calif., assignor to The Garrett Corporation, Los Angeles, Calif., a corporation of California Application June 26, 1953, Serial No. 364,464

10 Claims. (Cl. 318—55)

This invention relates generally to synchronizing systems, and particularly relates to an electronic control circuit for causing intermittent movement of each of a plurality of electric motors through a path of substantially equal length.

It is frequently desired to position a plurality of elements in such a manner that they move in unison in the same or in opposite directions through a path of substantially equal length. For example, it may be necessary to position the control surfaces of an airplane such, for example, as the flaps, ailerons or trim tabs either in the same or in opposite directions. To this end, each of the control surfaces or other elements to be positioned are coupled to a separate electric motor. Consequently, in order to move the elements to be positioned through equal paths it is necessary that the motors should run at constant speeds. Since the speed of each motor depends on its load and other circumstances, the electric motors must be rapidly synchronized so that after a predetermined short time, all the elements will be positioned correctly. It is furthermore desirable to control the speed of one motor which may become asynchronized with respect to the remaining motors, so that its speed is controlled by the remaining motors. Usually, the motor that is faster than the other motors will have its speed reduced until all motors are rotating again in synchronism.

It is accordingly an object of the present invention to provide a novel electronic control circuit for synchronizing a plurality of electric motors.

A further object of the invention is to provide, in a system for moving each of a plurality of elements through paths of substantially equal length by means of electric motors, electronic control means for energizing the motors intermittently and for decreasing the interval of time during which a fast rotating motor is energized so as to return the fast motor rapidly into synchronism with the other and slower motors.

Another object of the invention is to provide an electronic control system for synchronizing two or more reversible electric motors, and for controlling the speed of the motors in accordance with the speed of the slowest motor, to cause the motors to rotate intermittently through substantially equal total angles.

In accordance with the present invention two or more electric motors are energized intermittently. Essentially the time interval during which each motor remains energized is controlled in such a manner that an asynchronous motor is rapidly brought into synchronism with the other motors. For example, if one of the motors should rotate faster than the others it is energized for a shorter interval of time than the other motors until they all have rotated through equal angles. To this end, an error signal is developed which is representative of the extent of asynchronization of one of the motors with respect to the remaining motors. This error signal is combined with a control signal causing intermittent energization of the motors. Consequently, each motor is intermittently energized by switch means. The switch means associated with the asynchronous motor has its actuation modified so as to return the asynchronous motor into synchronism with the remaining motors. The control system of the invention may also be applied to reversible electric motors and is capable of operating them in either direction of rotation.

Figure 2:
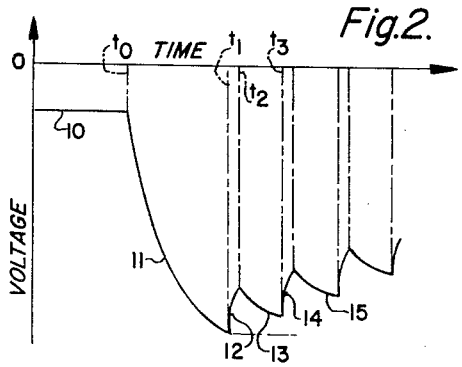
Figure 3:
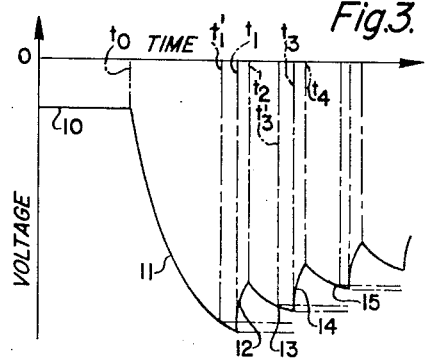
Figure 4:
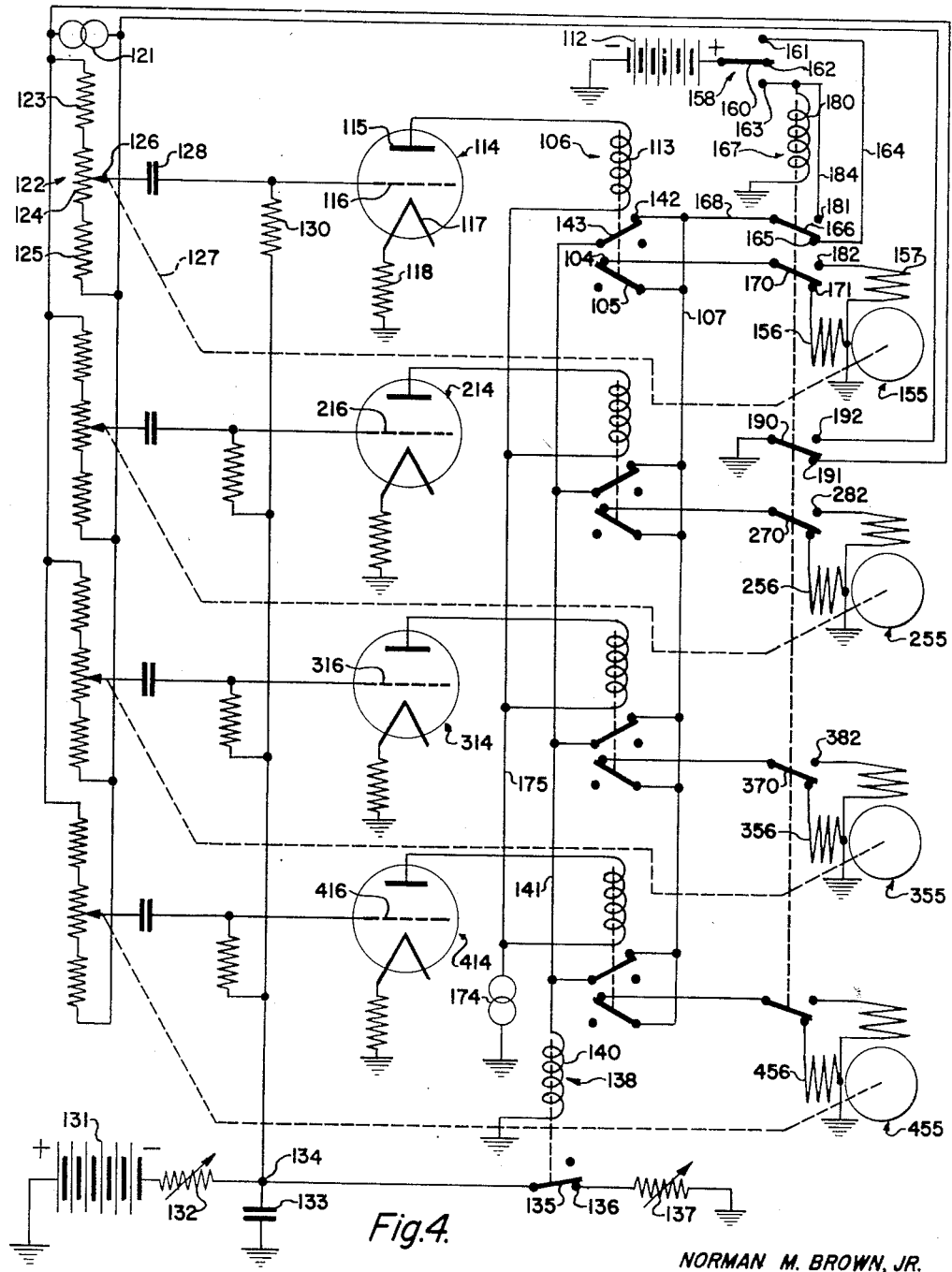

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Fig. 1 is a circuit diagram of a synchronizing system embodying the present invention;

Figs. 2 and 3 are graphs of a voltage wave plotted with respect to time and developed by the system of Fig. 1, Fig. 2 illustrating a condition when motors are running in synchronism, and Fig. 3 depicting a condition when one of the motors runs faster than the other motors; and Fig. 4 is a circuit diagram of a synchronizing system modified in accordance with the invention and including reversible electric motors.

Referring now to the drawings in which like components have been designated by the same reference characters, and particularly to Fig. 1, there is illustrated a synchronizing system including three electric motors 100, 200 and 300. Electric motor 100 includes a field winding 101 and a rotating armature or rotor 102 which may be mechanically coupled to an element to be positioned. One terminal of field winding 101 is grounded as shown while the other one is connected through a conductor 103, a fixed contact 104 and a movable arm 105 of a relay 106, a conductor 107, a fixed contact 108 and a movable arm 110 of a master or control switch 111 to a suitable source of voltage such as battery 112. The negative terminal of battery 112 is grounded to complete the circuit for energizing field winding 101 when master switch 111 is closed.

The relay 106 includes an energizing winding 113 which is connected in the plate circuit of an electron discharge device such as a triode 114. Triode 114 has an anode 115, a control grid 116 and a cathode 117 which is grounded through a cathode bias resistor 118. One terminal of relay winding 113 is connected to anode 115 while the other terminal is connected through a conductor 120 to one terminal of an alternating current source schematically indicated at 121 which has its other terminal grounded. A potentiometer 122 is connected across alternating current source 121 and includes resistors 123, 124 and 125 serially connected across the source. A movable arm or slider 126 is movable over resistor 124 and is mechanically coupled as schematically shown at 127 to rotor 102 to be positioned thereby. Movable arm 126 is electrically coupled to control grid 116 through a coupling capacitor 128.

The control grid 116 is connected through an isolating resistor 130 to a suitable source of voltage such as a battery 131 through a resistor 132. The positive terminal of battery 131 is grounded as shown. A capacitor 133 is connected across battery 131 and resistor 132. The junction point 134 of resistor 132 and capacitor 133 is grounded through a movable arm 135, a fixed contact 136 and a resistor 137. Movable arm 137 and fixed contact 136 form part of a control relay 138 having an energizing winding 140. One terminal of winding 140 is grounded while the other one is connected through a conductor 141, a fixed contact 142, a movable arm 143, conductor 107, contacts 108 and 110 to battery 112. Movable arm 143 is controlled by relay 106. Contacts 135, 136 are closed as long as relay winding 140 remains de-energized. On the other hand, contacts 142 and 143, 104 and 105 are closed as long as relay winding 113 remains energized.

It will be noted that only battery 112, master switch 111, relay 138, battery 131, resistors 132, 137 and capacitor 133 are common to all the motors. Each of the three motors, such as motor 100, has a separate potentiometer 122, triode 114, and relay 106. These circuit components associated with motors 200 and 300 such, for example, as triodes 214 and 314 have been designated with reference numerals corresponding to those of the components associated with motor 100 and are distinguished by having numbers beginning with 200 and 300 respectively.

The operation of the circuit of Fig. 1 will now be explained. Let it first be assumed that master switch 111 is open as shown in Fig. 1. Under these conditions triodes 114, 214 and 314 are conductive since plate voltage is applied to their respective anodes through the windings 113, 213 and 313. A positive alternating voltage is impressed on each of the control grids of the triodes through coupling capacitor 128 and so on. As long as contacts 135 and 136 are closed, a relatively low negative voltage will exist at junction point 134, and the magnitude of this voltage is determined by the relative resistances of resistors 132 and 137 which form a voltage divider connected across battery 131. The combined voltage applied from junction point 134 through resistor 130 and from movable arm 126 through capacitor 128 to control grid 116 is such that it will permit the triodes 114, 214 and 314 to conduct space current.

Since the anode currents of the triodes flow through their respective relay windings 113, 213 and 313, the movable arms 105, 205, 143, 243, etc. are in the upper position, as shown in Fig. 1. However, so long as master switch 111 remains open, neither the motors 100, 200, 300 nor relay 138 are energized.

Let it now be assumed that master switch 111 is closed. This will immediately energize the three motors. The current through field winding 101, for example, may be traced from ground through the winding 101, conductor 103, contacts 104, 105, conductor 107, contacts 108, 110 and battery 112 back to ground. At the same time, relay winding 140 becomes energized through a path from ground through the winding, conductor 141, contacts 142, 143 (or contacts 242, 243, or 342, 343), conductor 107, contacts 108, 110 and battery 112 back to ground. Consequently, movable arm 135 is disconnected from fixed contact 136, and resistor 137 is no longer connected across capacitor 133.

As a result, an exponentially increasing voltage wave is built up across capacitor 133. This voltage wave is shown in Fig. 2 to which reference is now made. The curve portion 10 of Fig. 2 indicates the steady state voltage which exists at junction point 134 as long as contacts 135 and 136 are closed. Upon closing master switch 111 at a time to the wave, exponentially increasing in a negative direction is shown by curve portion 11 in Fig. 2. This is due to the fact that the full negative voltage of battery 131 is now applied through resistor 132 across capacitor 133 so that eventually the voltage across capacitor 133 will equal the battery voltage in the absence of grid current flow. The shape of curve portion 11 depends on the resistance of resistor 132 and the capacitance of capacitor 133. At a time $t_1$ the voltage indicated by curve portion 11 is of such a magnitude that it will so far exceed the positive alternating voltage applied through capacitor 128 that it will cut off triode 114 (or reduce its plate current below the relay drop-out value) because the voltage of capacitor 133 is impressed on control grid 116 through resistor 130.

As soon as triode 114 ceases to conduct, or its current is less than the relay drop-out value, relay winding 113 becomes de-energized and movable arms 105 and 143 are disconnected from their fixed contacts 104, 142 respectively. This, in turn, will de-energize field winding 101 and rotor 102 is either slowed down or stopped. Preferably, the motor is braked or disengaged through a clutch to either stop the motor or reduce its speed.

Since triodes 214 and 314 also cease to conduct the relay windings 213 and 313 also become de-energized. Consequently, movable arms 205 and 305 are disengaged from their fixed contacts 204 and 304 to de-energize field windings 201 and 301. De-energization of the relays 213 and 313 will also disconnect movable arms 243 and 343 from their fixed contact 242 and 342. Consequently, relay winding 140 is disconnected from battery 112. Accordingly, contacts 135 and 136 are again closed and resistor 137 is now connected across capacitor 133.

The previously developed high negative voltage across capacitor 133 now leaks off to ground through resistor 137. An exponentially decreasing negative voltage wave is developed across the capacitor, which is illustrated by curve portion 12 in Fig. 2. The shape of the decreasing voltage wave is determined essentially by the capacitance of capacitor 133 and by the resistance of resistor 137. This voltage decreases until at a time $t_2$ the grid voltage of the triodes is of such value as to energize relays 106, etc., to pull in their contact arms. The motors then become energized again in the manner previously explained until at a time $t_3$, the grid voltage becomes sufficiently negative to cut off the tubes or reduce the anode currents to such a value that their relays drop out again. This action is continued as long as master switch 111 is closed.

It will be observed from Fig. 2 that successive curve portions 12, 13, 14, 15 and so on reverse their directions at values which are successively less negative. This is due to the fact that as motor 100 rotates, for example, its rotor 102 moves movable arm 126 of potentiometer 122 in the direction indicated by arrow 150. Consequently, the voltage impressed through coupling capacitor 128 on the control grid of triode 114 become less positive and therefore a smaller negative voltage is required from junction point 134 to reach cut-off of the triode.

The saw-tooth voltage wave developed by battery 131 and the network 132, 133, 137 including switch arm 135 may have any desired shape. By way of example, the motors may normally be energized during 0.5 second and de-energized during 0.1 second.

During the preceding discussion, it has been assumed that the three motors 100, 200 and 300 rotate in synchronism. Let it now be assumed that motor 100 rotates temporarily faster than motors 200 and 300. In that case, potentiometer arm 126 will be moved a larger distance in a given time than movable arms 226 and 326. As a consequence, a smaller voltage is impressed through coupling capacitor 128 on control grid 116 of triode 114 than is impressed on control grids 216, 316 from their potentiometer arms 226 and 326. Since the same voltage wave represented by the curve portions in Fig. 3 is also impressed from junction point 134 and resistor 130 on the control grid 116, the tube 114 will be cut off at an earlier time $t_1'$ (Fig. 3) because the control grid 116 now requires a smaller negative voltage to reach cut-off.

As a consequence, triode 114 will be cut off for a longer period of time from $t_1'$ to $t_2$ while triodes 214 and 314 are cut off for a shorter period of time between $t_1$ and $t_2$. As a result, motor 100 has a shorter duty cycle and tends to be returned to synchronism. During the subsequent cycle triode 114 will be cut off between times $t_3'$ and $t_4$ while the other triodes 214 and 314 are cut off for a shorter interval of time from $t_3$ to $t_4$. As motor 100 approaches synchronism, its duty cycle will become larger again until it equals that of the other motors when synchronism has been achieved.

It will be appreciated from the previous discussion that relay 138 remains energized as long as any one of the relays 106, 206 or 306 is energized. It is also to be understood that the synchronizing system of the invention will simultaneously control two or more motors which have become faster than the remaining motor or motors. In this case, the duty cycle of the fastest motor will be the shortest while that of the second fastest motor will be slightly longer and the duty cycle of the slowest motor is the longest.

Once the master switch 111 is closed, the motors 100, 200, and 300 continue to rotate intermittently until the master switch is opened again. However, it is also feasible to provide a limit switch which may either be coupled directly to the motors 100, 200, 300 or which may be coupled to the movable arms 126, 226, 326 of the potentiometers to disconnect power from the motors when the limit of either the motor travel or of the movable arm of the potentiometers has been reached.

It is also feasible to apply the control system of the present invention to a plurality of reversible electric motors. Such a system is illustrated in Fig. 4 to which reference is now made. The circuit of Fig. 4 includes four reversible electric motors 155, 255, 355, 455. Motor 155, for example, is provided with two field windings 156 and 157 which may be selectively energized to rotate the motor in opposite directions. The field windings may be energized from battery 112 through a master switch 158 having a movable arm 160 engageable with three fixed contacts 161, 162 and 163. When the movable arm 161 engages fixed contact 162, the control system is not energized.

Again there is associated with each of the four reversible motors, such as motor 155, a potentiometer 122, a triode 114 and a relay 106. Battery 112, master switch 158, relay 138 and the saw-tooth voltage wave generator including battery 131, resistors 132, 137 and capacitor 133 are common to the electric motors, similarly to the arrangement shown in Fig. 1.

Let it now be assumed that switch arm 160 is moved to engage fixed contact 161. Accordingly, positive voltage is applied from battery 112 through contact 161, a conductor 164, a fixed contact 165 and movable arm 166 of a relay 167, and through a conductor 168 to conductor 107. The positive potential is then applied through contacts 104, 105, a movable arm 170 and fixed contact 171 of the relay 167 to the field winding 156. In a similar manner, positive voltage is applied to windings 256, 356 and 456 of motors 255, 355 and 455.

The operation of the circuit is otherwise as previously described in connection with Fig. 1. It will be noted, however, that the anode voltage is applied to triodes 114, 214, 314 and 414 through a suitable alternating current source indicated at 174 through a conductor 175 and relay winding 113, for example. It will be understood that sources 121 and 174 may be one source. The frequencies of the alternating currents developed by the two sources should be equal. However, the phase of the alternating current applied by source 121 to the potentiometer 122, for example, must be changed when it is desired to change the direction of rotation of the electric motor. The phase of the output voltage impressed through coupling capacitor 123 on the control grid of triode 114 must be equal to the phase of the voltage supplied to its anode.

It will be noted that as long as winding 180 of relay 167 is de-energized, the movable arms 166, 170, 270 and so on, are in the positions shown on the drawing. Let it now be assumed that it is desired to rotate the motors in the opposite direction. To this end, the movable arm 160 of master switch 158 is rotated to engage with fixed contact 163. Accordingly, relay winding 180 becomes energized by battery 112. This, in turn, will cause the movable arms 166 and 170 to engage their respective fixed contacts 181 and 182. At the same time, movable arms 270, 370 and so on engage their fixed contacts 282 and 382 respectively. The positive battery voltage is now applied through contacts 160, 163, a conductor 184, contacts 181, 166, conductors 168, 107, contacts 104 and 105, 170 and 182 to field winding 157. This will cause motor 155 to rotate in the opposite direction. The other motors will also be energized to move in the opposite direction. At the same time ground is removed from one terminal of source 121 and applied to its other terminal to change the phase of the voltage impressed, for example, on potentiometer 122. To this end, a movable arm 190 is grounded as shown and is controlled by relay winding 180. In the position shown in Fig. 4 a fixed contact 191 is engaged by the movable arm 190 to ground the left hand terminal of source 121. Upon energization of relay winding 180, the movable arm 190 is rotated to engage a fixed contact 192 whereby the right hand terminal of the source becomes grounded. Consequently, the phase of the alternating current is changed as required. The circuit of the invention again operates in the manner previously described.

It will further be noted that, for example, movable arm 126 of potentiometer 122 will either move up or down depending upon the direction of rotation of its motor 155. Accordingly, the elements to be positioned can be moved in opposite directions to a desired end position, whereupon the master switch is opened again. As was previously pointed out it is also feasible to provide limit switches for limiting the movement of the motors to their extreme positions. The duty cycle of each motor is again controlled as explained in connection with Figs. 1 and 3.

There has thus been disclosed an electronic control system for controlling the speed of a plurality of electric motors which may be reversible. Preferably, the speed of a motor which is faster than the remaining motors is controlled by reducing its duty cycle until it moves again in synchronism with the other motors. If two or more motors and running faster than the remaining motor or motors, the duty cycles of the fastest motor and next fastest motor are reduced to an extent depending on the degree of asynchronism until all motors are again in synchronism. In this manner, it is possible to position a plurality of mechanical elements by causing them to travel along paths of substantially equal length.

I claim:

1. A system for synchronizing a plurality of electric motors comprising: a source of power for said motors, a source of control voltage, a supply circuit connected to said source of power, switch means included in said supply circuit and individual to each of said motors for selectively connecting said source of power to each of said motors, a control circuit coupled to said source of control voltage and to said switch means, a signal source coupled to said control circuit for periodically actuating said switch means thereby to simultaneously energize or de-energize said motors, circuit means coupled to said control voltage source and to each of said motors for developing an error signal representative of the extent of asynchronization of one of said motors with respect to the remaining motors, and means coupled to said control circuit and to said circuit means for combining said error signal with the signal developed by said signal source for modifying actuation of the switch means associated with the asynchronous motor in a manenr so as to return said asynchronous motor into synchronism with the remaining motors.

2. A system for synchronizing a plurality of electric motors comprising: a source of power for said motors, a source of control voltage, a supply circuit connected to said source of power, electromagnetic switch means included in said supply circuit and individual to each of said motors for selectively connecting said source of power to each of said motors, a control circuit coupled to said source of control voltage and to said switch means, a signal source coupled to said control circuit for periodically actuating said switch means thereby to simultaneously energize or de-energize said motors, circuit means coupled to said control voltage source and to each of said motors for developing an error signal representative of the extent of asynchronization of one of said motors that is moving faster than the remaining motors, and means coupled to said control circuit and to said circuit means for combining said error signal with the signal developed by said signal source for modifying actuation of the switch means associated with the faster motor in a manner so as to return said faster motor into synchronism with the remaining motors.

3. A system for synchronizing a plurality of electric motors comprising: a source of power for said motors, a source of control voltage, a supply circuit connected to said source of power, relay means included in said supply circuit and individual to each of said motors for selectively connecting said source of power to each of said motors, a control circuit coupled to said source of control voltage and to said switch means, a signal source coupled to said control circuit for developing a saw-tooth voltage wave to intermittently energize said relay means and said motors, circuit means coupled to said control voltage source and to each of said motors for developing an error signal representative of the extent of asynchronization of one of said motors that moving faster than the remaining motors, and means coupled to said control circuit and to said circuit means for combining said error signal with said saw-tooth voltage wave for energizing the relay means associated with the faster motor for a shorter interval of time than the remaining relay means so as to return said faster motor into synchronism with the remaining motors.

4. A system for simultaneously moving at will each of a plurality of elements through a path of substantially constant length, said system comprising: a plurality of electric motors, each for positioning one of the elements, a source of power, a master switch, a supply circuit including an electromagnetic relay for each motor for selectively connecting said source of power through said master switch to each of said motors, a first source of voltage, potentiometer means for each of said motors and coupled thereto to be positioned thereby, each of said potentiometer means being connected across said first source of voltage, an electron discharge device for each of said motors, each having input and output electrodes, the input electrodes of each of said devices being coupled to the potentiometer means of its associated motor, the output electrodes of each of said devices being coupled to the relay of its associated motor, means rendering said devices normally conductive to energize their associated relays, whereby said motors are energized upon closing of said master switch, circuit means coupled to the input electrodes of said device for developing an exponentially increasing voltage wave of a polarity to cut off said devices after a predetermined interval of time determined by said increasing voltage wave and by the position of each motor, and means coupled to said circuit means and to each of said relays in parallel for developing an exponentially decreasing voltage wave in response to deenergization of all of said relays, said decreasing voltage wave causing conduction of said device after a predetermined interval of time determined by said decreasing wave whereby a motor that moves faster than the other motors will cause the device associated therewith to be cut off at an earlier instant than the other devices.

5. A system for simultaneously moving at will each of a plurality of elements through a path of substantially constant length, said system comprising: a plurality of electric motors, each for positioning one of the elements, a source of power, a master switch, a supply circuit including an electromagnetic relay for each motor for selectively connecting said source of power through said master switch to each of said motors, a first source of voltage, a potentiometer for each of said motors, each having a movable arm coupled to its associated motor to be positioned thereby, each of said potentiometers being connected across said first source of voltage, an electron discharge device for each of said motors, each having input and output electrodes, the input electrodes of each of said devices being coupled to the potentiometer and movable arm of its associated motor, the output electrodes of each of said devices being coupled to the relay of its associated motor, means rendering said devices normally conductive to energize their associated relays, whereby said motors are energized upon closing of said master switch, circuit means coupled to the input electrodes of said device for developing an exponentially increasing voltage wave of a polarity to cut off said devices after a predetermined interval of time determined by said increasing voltage wave and by the position of the movable arm of each potentiometer, and means coupled to said circuit means and to each of said relays in parallel for developing an exponentially decreasing voltage wave in response to de-energization of all of said relays, said decreasing voltage wave causing conduction of said devices after a predetermined interval of time determined by said decreasing voltage wave whereby a motor that moves faster than the other motors will move the movable arm of its associated potentiometer to a different position than that of the movable arms of the potentiometer of said other motors to cut off the device associated with said faster motor at an earlier instant than the other devices are cut off.

6. A system for causing a plurality of electric motors to move intermittently through a path of substantially constant length comprising: a source of power, a supply circuit including electromagnetic relay means for each motor for selectively connecting said source of power to each of said motors, a first source of voltage, potentiometer means for each motor coupled thereto to be positioned thereby, said potentiometer means being connected across said first source of voltage, an electron discharge device for each motor, each having input and output electrodes, the input electrodes of each device being coupled to the potentiometer means of the associated motor, the output electrodes of each device being coupled to the relay means of the associated motor, means rendering said devices normally conductive to energize their associated relays, a second source of voltage, a first resistor and a capacitor connected serially across said second source of voltage, a second resistor, a further relay including a switch for connecting said second resistor across said capacitor, circuit means coupling said capacitor to the input electrodes of said devices, said further relay being coupled in parallel to each of said relay means to be energized upon energization of one of said relay means to open the switch of said further relay and to be de-energized upon de-energization of all of said relay means to close the switch of said further relay.

7. A system for causing a plurality of electric motors to move intermittently through a path of substantially constant length comprising: a source of power, a supply circuit including an electromagnetic relay and a switch for each motor for selectively connecting said source of power to each of said motors, a first source of voltage, a potentiometer for each motor, each having a movable arm coupled to its associated motor to be positioned thereby, said potentiometers being connected across said first source of voltage, an electron discharge device for each motor, each having input and output electrodes, the input electrodes of each device being coupled to the potentiometer and movable arm of its associated motor, the output electrodes of each device being coupled to the relay of its associated motor, means rendering said devices normally conductive to energize their associated relays and close the switches thereof, a second source of voltage, a first resistor and a capacitor connected serially across said second source of voltage, a second resistor, a further relay having a switch for connecting said second resistor across said capacitor, circuit means coupling said capacitor to the input electrodes of said devices, said further relay being coupled in parallel to each of the switches of said electromagnetic relays to be energized upon closure of one of said switches to open the switch of said further relay and to be de-energized upon opening of all of the switches of said electromagnetic relays to close the switch of said further relay.

8. A system for simultaneously moving at will each of a plurality of elements through a path of substantially constant length, said system comprising: a plurality of electric motors, each for positioning one of the elements, a source of power, a master switch, a supply circuit including an electromagnetic relay for each motor for selectively connecting said source of power through said master switch to each of said motors, a first source of voltage, potentiometer means individual to each of said motors and coupled to be positioned thereby, said potentiometer means being connected across said first source of voltage, an electron discharge device for each of said motors, each having input and output electrodes, the input electrodes of each of said devices being coupled to the potentiometer means of its associated motor, the output electrodes of each of said devices being coupled to the relay of its associated motor, means rendering said devices normally conductive to energize their associated relays, whereby said motors are energized upon closing of said master switch, a second source of voltage, a first resistor and a capacitor coupled across said second source of voltage, said capacitor being coupled to the input electrodes of said devices, a further relay and a second resistor connected across said capacitor, said further relay being coupled to said electromagnetic relays and energized upon closure of said master switch and upon energization of said relays to disconnect said second resistor from said capacitor, said second source of voltage being poled so as to cut off each of said devices a predetermined interval of time after energization of said further relay, said predetermined interval of time being determined by the resistance of said first resistor and the capacitance of said capacitor and the position of each motor, whereby a motor that moves faster than the remainder of said motors remains de-energized for a longer interval of time than the remainder of said motors.

9. A system for simultaneously moving at will each of a plurality of elements through a path of substantially constant length, said system comprising: a plurality of electric motors, each for positioning one of the elements to be positioned, a source of power, a master switch, a supply circuit including an electromagnetic relay for each motor for selectively connecting said source of power through said master switch to each of said motors, a first source of voltage, a potentiometer for each of said motors, each having a movable arm coupled to its associated motor to be positioned thereby, each of said potentiometers being connected across said first source of voltage, an electric discharge device for each of said motors, each having input and output electrodes, the input electrodes of each of said devices being coupled to the potentiometer and movable arm of its associated motor, the output electrodes of each of said devices being coupled to the relay of its associated motor, means rendering said devices normally conductive to energize their associated relays, whereby said motors are energized upon closing of said master switch, a second source of voltage, a first resistor and a capacitor coupled across said second source of voltage, said capacitor being coupled to the input electrodes of said devices, a further relay and a second resistor connected across said capacitor, said further relay being coupled to said electromagnetic relays and energized upon closure of said master switch and upon energization of said relays to disconnect said second resistor from said capacitor, said second source of voltage being poled so as to cut off each of said devices a predetermined interval of time after energization of said further relay, said predetermined interval of time being determined by the resistance of said first resistor and the capacitance of said capacitor and by the position of the movable arm of each of said potentiometers, whereby a motor that moves faster than the remainder of said motors remains deenergized for a longer interval of time than the remainder of said motors.

10. A system for simultaneously moving at will each of a plurality of elements through a path of substantially constant length, said system comprising: a plurality of reversible electric motors, each for positioning one of the elements, a source of power, a master switch, a supply circuit including an electromagnetic relay having a switch for each motor for selectively connecting said source of power through said master switch to each of said motors to rotate said motor in a selected direction, a first source of voltage, a potentiometer for each of said motors, each having a movable arm coupled to its associated motor to be positioned thereby, each of said potentiometers being connected across said first source of voltage, an electron discharge device for each of said motors, each having input and output electrodes, the input electrodes of each of said devices being coupled to the potentiometer and movable arm of its associated motor, the output electrodes of each of said devices being coupled to the relay of its associated motor, means rendering said devices normally conductive to energize their associated relays, whereby said motors are energized to rotate in a selected direction upon selective actuation of said master switch, a second source of unidirectional voltage, a first resistor and a capacitor coupled across said second source of voltage, said capacitor being coupled to the input electrodes of said devices, a further relay having a switch, a second resistor and the switch of said further relay being connected in parallel across said capacitor, said further relay being coupled to said electromagnetic relays and energized upon actuation of said master switch and upon energization of said relays to disconnect said second resistor from said capacitor, said second source of voltage being poled so as to cut off each of said devices a predetermined interval of time after energization of said further relay, said predetermined interval of time being determined by the resistance of said first resistor and the capacitance of said capacitor and by the position of the movable arm of each of said potentiometers, whereby a motor that moves faster than the remainder of said motors remains de-energized for a longer interval of time than the remainder of said motors.

No references cited.